(12) United States Patent
Koike et al.

(10) Patent No.: US 9,238,555 B2
(45) Date of Patent: *Jan. 19, 2016

(54) MEDICINE FEEDING DEVICE, AND MEDICINE COUNTING DEVICE

(71) Applicant: YUYAMA MFG. CO., LTD., Toyonaka-shi, Osaka (JP)

(72) Inventors: Naoki Koike, Toyonaka (JP); Mitsuhiro Mitani, Toyonaka (JP)

(73) Assignee: YUYAMA MFG. CO., LTD., Toyonaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,846

(22) Filed: Apr. 22, 2015

(65) Prior Publication Data

US 2015/0224030 A1 Aug. 13, 2015

Related U.S. Application Data

(63) Continuation of application No. 13/992,967, filed as application No. PCT/JP2011/077901 on Dec. 2, 2011, now Pat. No. 9,038,816.

(30) Foreign Application Priority Data

Dec. 9, 2010 (JP) ................................. 2010-275047

(51) Int. Cl.
*B65G 47/14* (2006.01)
*A61J 7/02* (2006.01)
(Continued)

(52) U.S. Cl.
CPC ............... *B65G 47/1428* (2013.01); *A61J 7/02* (2013.01); *B65B 1/14* (2013.01); *B65B 35/06* (2013.01); *B65B 65/08* (2013.01); *B65G 47/14* (2013.01)

(58) Field of Classification Search
CPC ............... B65G 29/00; B65G 47/1414; B65G 47/1435; B65G 47/1442; B65G 47/1457; B65G 47/1464; B65G 47/1471; B65G 2201/027; B65G 2203/0241; B65B 1/14; B65B 65/08; A61J 7/02
See application file for complete search history.

(56) References Cited

U.S. PATENT DOCUMENTS 2,523,517 A * 9/1950 Potter .................... G06M 1/101
177/14
3,297,133 A * 1/1967 Sterling ............. B65G 47/1471
193/44
(Continued)

FOREIGN PATENT DOCUMENTS

CN 1723005 A 1/2006
JP 50-135765 A 10/1975
(Continued)

*Primary Examiner* — Leslie A Nicholson, III
*Assistant Examiner* — Keith R Campbell
(74) *Attorney, Agent, or Firm* — Masuvalley & Partners

(57) ABSTRACT

A medicine counting device including a rotary container broadening radially in an upward direction and configured to rotate around an axis of the rotary container; a guide member fixed with a predetermined gap on a top surface side of the rotary container, spirally extending from the central portion towards an outer circumference of the rotary container, and configured to guide a medicine moved by a rotation of the rotary container from the central portion towards the outer circumference of the rotary container. The medicine counting device further includes a detector provided outside of the rotary container and a regulator configured to feed a medicine having been moved to the outer circumference and being in contact with the guide member towards the detector but returns the medicines which are not being in contact with the guide member to the central portion side of the rotary container by overpassing the guide member.

11 Claims, 17 Drawing Sheets

(51) Int. Cl.
 *B65B 65/08* (2006.01)
 *B65B 1/14* (2006.01)
 *B65B 35/06* (2006.01)

(56) References Cited

U.S. PATENT DOCUMENTS

| | | | | | |
|---|---|---|---|---|---|
| 3,386,618 | A | * | 6/1968 | Gilbert | A61J 7/02 221/12 |
| 3,640,373 | A | * | 2/1972 | Seragnoli | B65G 47/682 198/392 |
| 3,746,211 | A | * | 7/1973 | Burgess, Jr. | G06M 7/00 221/13 |
| 3,837,139 | A | * | 9/1974 | Roseberg | B65B 57/20 221/7 |
| 4,245,733 | A | * | 1/1981 | Kubota | B65G 31/04 198/391 |
| 4,462,508 | A | * | 7/1984 | Grafius | B65G 47/1421 198/382 |
| 5,191,960 | A | * | 3/1993 | Wareham | B65G 47/1421 198/389 |
| 5,369,940 | A | * | 12/1994 | Soloman | B65B 57/20 53/500 |
| 6,257,392 | B1 | * | 7/2001 | Graham | B65G 47/1421 198/391 |
| 6,659,304 | B2 | * | 12/2003 | Geltser | A61J 7/0076 221/277 |
| 6,994,248 | B2 | * | 2/2006 | Belway | A61J 7/02 235/103 |
| 8,827,112 | B2 | * | 9/2014 | Yuyama | A61J 7/02 221/224 |
| 9,038,816 | B2 | * | 5/2015 | Koike | A61J 7/02 198/803.16 |

FOREIGN PATENT DOCUMENTS

JP 2001-204795 A 7/2001
JP 2003-118828 A 4/2003

* cited by examiner

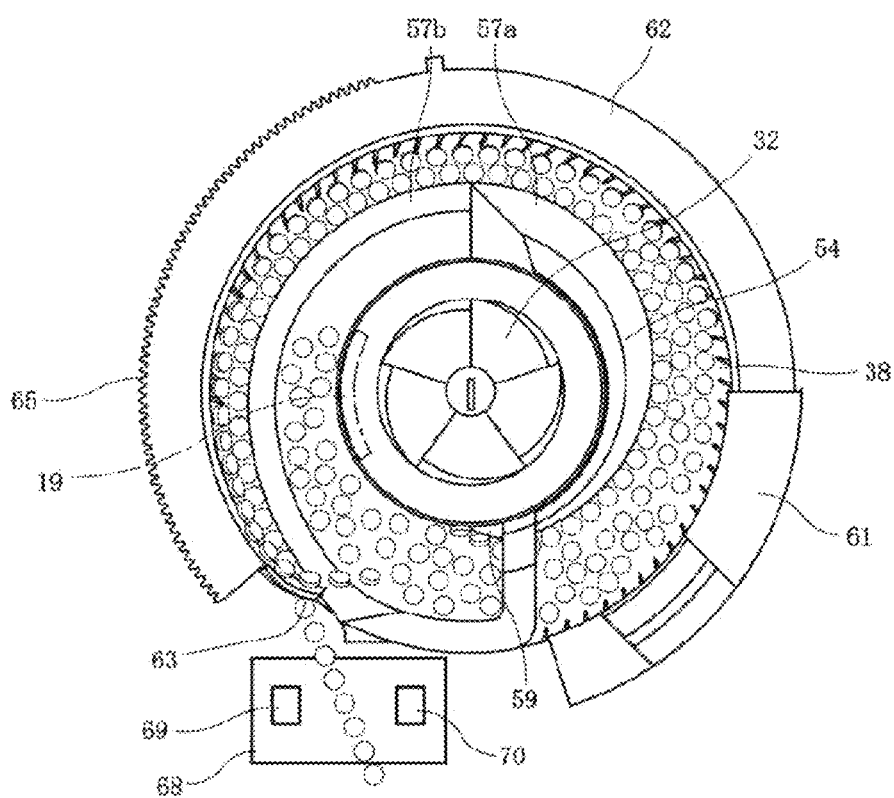

MEDICINE FEEDING DEVICE, AND MEDICINE COUNTING DEVICE

This application claims priority under 35 U.S.C. §120 as a continuation of U.S. patent application Ser. No. 13/992,967, filed Jun. 10, 2013, which is a national phase application under 35 U.S.C. §371 of International Application Serial No. PCT/JP2011/077901, filed on Dec. 2, 2011, and claims the priority under 35 U.S.C. §119 to Japanese Patent Application No. 2010-275047, filed on Dec. 9, 2010, which are hereby expressly incorporated by reference in their entirety for all purposes.

TECHNICAL FIELD

The present invention relates to a medicine feeding device capable of feeding medicines such as tablets and capsules one by one at a high speed, and a medicine counting device capable of counting medicines at a high speed.

BACKGROUND OF THE INVENTION

A medicine counting device capable of counting a large number of medicines at a high speed is described in the Japanese Patent Application Publication No. 2001-204795 (hereinafter Patent Document 1). This medicine counting device is provided with a rotor having a guide groove in the outer circumferential surface that allows a medicine of specific shape to pass through. A large quantity of medicines introduced from a hopper is supplied onto the rotating rotor, passes and drops through the guide groove of the outer circumference. Then, the medicine is detected by a detection means such as a light sensor, and counted.

However, there are multiple types of medicines such as tablets where a medicine is compressed or capsules where a medicine is contained inside a capsule, and the shape and size may vary even within the same kind of medicine. Thereupon, as for the medicine counting device of Patent Document 1, because the guide groove of the rotor allows only a certain type of medicine to pass through, there is a need to replace or adjust the rotor in order to count medicine of different shapes or sizes. Further, even if the vertical and horizontal dimensions are identical, if the dimension in the height direction is different, it is necessary to adjust the height of the rotor with respect to the partition plate.

Meanwhile, a parts feeder to continuously feed objects different from medicine such as screws is disclosed in the Japanese Patent Application Publication No. 2003-118828 (hereinafter Patent Document 2). This parts feeder is provided with a saucer-shaped rotary container that is rotatable, and a spiral guide rail disposed non-rotatable on this rotary container. An object fed to the center of the rotary container will move radially outward along the guide rail by the rotation of the rotary container. Then, among the objects that have moved from the guide rail to the flange of the rotary container, only an object having a specified posture is allowed to pass by a regulating member, and an object having a different posture is returned to the upstream.

However, because such a parts feeder of Patent document 2 allows only objects of specified posture to pass through, the range of objects allowed to pass by the regulating member 104 is narrow. Accordingly, as shown in FIG. 15, when two objects 102 and 103 on a flange 101 are discharged in a state aligned in the radial direction of the rotary container, the object 102 on the outer side comes in contact with the regulating member 104. As a result, the object 102 on the outer side moves along the regulating member 104 towards the center of the rotary container, collides with the inner side object 103, and pushes the inner side object 103 to the center of the rotary container. During the collision, the moving directions of the outer and inner objects 102 and 103 change respectively thereby obstructing the movement of the object in the upstream of the rotating direction, leading to drawbacks such as blocking of the objects or an inability to dispense the objects faster. In case the dispensing speed of an object is increased by increasing the rotational speed of the rotary container, the impact of the collision will be large when the outer object 102 contacts the regulating member 104 or when the outer object 102 contacts the inner object 103. Therefore, in case of dispensing medicine at a high speed with the parts feeder of the Patent Document 2, there may be drawbacks such as occurrence of chipping of the medicine.

The objective of the present invention is to provide a medicine feeding device capable of feeding medicine one by one without causing cracking or chipping, and a medicine counting device capable of counting medicine without causing cracking or chipping.

SUMMARY OF THE INVENTION

To solve the problem mentioned above, a medicine counting device of the present invention includes: a rotary container broadening radially in an upward direction and configured to rotate around an axis of the rotary container by a drive means, wherein a plurality of medicines are configured to be fed into a central portion of the rotary container; a guide member fixed with a predetermined gap on a top surface side of the rotary container, spirally extending from the central portion of the rotary container towards an outer circumference thereof, and configured to guide a medicine moved by a rotation of the rotary container from the central portion of the rotary container towards the outer circumference of the rotary container; a detector provided outside of the rotary container; and a regulator configured to feed a medicine having been moved to the outer circumference and being in contact with the guide member towards the detector, and to return a medicine having been moved to the outer circumference and not being in contact with the guide member to the central portion side of the rotary container by overpassing the guide member.

Since this medicine counting device moves medicine along the guide member by rotation of the rotary container, even if there is a medicine of different shape, provided it is a medicine of a width that can pass through the gap between the guide member and regulator, it can be transferred without adjustment, detected by a detector and counted. Therefore, it is possible to increase the versatility relating to high speed counting of a medicine. Also, a configuration is provided wherein, among the medicines that are moved towards the detector, a medicine that is not contacting the guide member will not be intercepted by the regulator but instead returned towards the central portion by overpassing the guide member, and therefore, the occurrence of clogging can be reliably prevented, and there will be no disruption of the counting operation. Moreover, because a collision of a large number of medicines can be prevented, it is possible to reliably prevent the occurrence of chipping and cracking of the medicines.

In this medicine counting device, it is preferable that an inclination angle of the outer circumference of the rotary container be greater than an inclination angle of the central portion of the rotary container. With this, when other medicines are piled up on the medicine in contact with the central portion of the rotary container wherein the inclination is small, the medicine at the top can be made to slide down to the center section by the outer circumference wherein the inclination angle is larger. Therefore, feeding of two medicines simultaneously towards the detector can be prevented.

It is preferable that a container-top member is fixed upon the rotary container, the container-top member having C-shape when seen from above and comprising a guide surface continuously elongating towards a top surface of the rotary container; and that the regulator is fixed at an edge part of the container-top member. With this, the inclination angle of the top section of the rotary container can be easily increased. Therefore, by providing a regulator in the end section of this container top member, a medicine that is not in contact with the guide member can be returned to the central portion.

Thereupon, it is preferable that the regulator be configured to rotate around the axis of the rotary container so as to adjust a gap between the regulator and the guide member. In this way, medicine with a different width can be adjusted to pass through one by one. Consequently, it becomes possible to count a variety of medicines having different shapes and sizes.

Also, it is preferable that a maximum height of an inner guide part located in a central portion side of the guide member be higher than a maximum height of an outer guide part located in an outer circumference side of the guide member. With this, medicine piled up at the top of the central portion where an inclination angle is small can be prevented from piling on the guide member. As a result, it becomes possible to count all the medicines reliably. In this case, it is preferable to provide a turnover part provided in an upstream end of the medicine movement direction of the inner guide part, the turnover part inclining outwards in a radius direction as approaching an upper side of the turnover part. With this, it becomes possible to prevent obstructing the movement of a medicine due to rolling of the medicine. As a result, it becomes possible to count all the medicines reliably.

Furthermore, it is preferable that at least either of the rotary container and the guide member is configured to move vertically along the axis so as to adjust a gap between the rotary container and the guide member. With this, medicines of varying shapes or size can be reliably counted.

It is preferable to include a hopper capable of feeding a plurality of medicines provided in the central portion of the rotary container, wherein a feeding port is provided in the hopper for feeding the medicine out of the hopper. With this, a plurality of medicines can be easily fed. In this case, it is preferable that the hopper include an adjustment member configured to adjust an opening area of the feeding port. With this, the feed quantity of medicine fed from the hopper to the rotary container can be adjusted. Therefore, apart from preventing the delay in counting speed when the feed quantity is small, it also becomes possible to prevent medicine getting stuck or piling when the feed quantity is large.

It is further preferable that a feed member for feeding a medicine out of the hopper through the feeding port be provided in the central portion of the rotary container, and the feed member is configured to be rotated by a drive means. With this, the medicine inside the hopper can be reliably fed to the top of the rotary container. In this case, it is preferable that the rotary container and the feed member are configured to be rotated by different drive means. With this, the feed quantity of medicine in the hopper fed to the rotary container can be adjusted. Therefore, apart from preventing the delay in counting speed when the feed quantity is small, it also becomes possible to prevent getting stuck or piling when the feed quantity is large.

In addition, the medicine feeding device of the present invention is provided with—a rotary container broadening radially in an upward direction, wherein a plurality of medicines are configured to be fed to the rotary container; a spiral-shaped guide member configured to guide a medicine fed to the rotary container to an outer side of the rotary container; and a regulator configured to return a medicine having been guided to an outer circumference of the rotary container and not being in contact with the guide member to the central portion side of the rotary container by overpassing the guide member and a medicine being in contact with the guide member.

It is preferable that the medicine counting device of the present invention further include a guide surface provided above the outer circumference of the rotary container, wherein a medicine having been guided to the outer circumference of the rotary container and not being in contact with the guide member is configured to be moved to the guide surface. It is also preferable that the medicine feeding device of the present invention is further provided with a detector on the outside of the rotary container for detecting a medicine fed to the outside of the rotary container. It is also preferable that the medicine counting device of the present invention is further provided with the medicine feeding device, and a counter configured to count a medicine being fed to the outside of the rotary container based on a detection result by the detector of the medicine feeding device.

In the medicine counting device of the present invention, medicine is moved along a guide member by rotating a saucer-shaped rotary container and the medicine is counted by detecting with a detector, and therefore, it is possible to feed and count the medicines one-by-one. Also, it is configured such that, when feeding medicine one-by-one to the detector, a medicine that is not in contact with the guide member is returned to the central portion by overpassing the guide member, and therefore, jamming can be reliably prevented, and in addition to feeding the medicine at high speed, occurrence of damage to a medicine can also be reliably prevented.

BRIEF DESCRIPTION OF THE DRAWINGS

The present disclosure is described in conjunction with the appended figures:

FIG. 13B is a plan view showing a state wherein the feed quantity of the medicine from hopper is large.

DETAILED DESCRIPTION OF THE INVENTION

Figure 1:
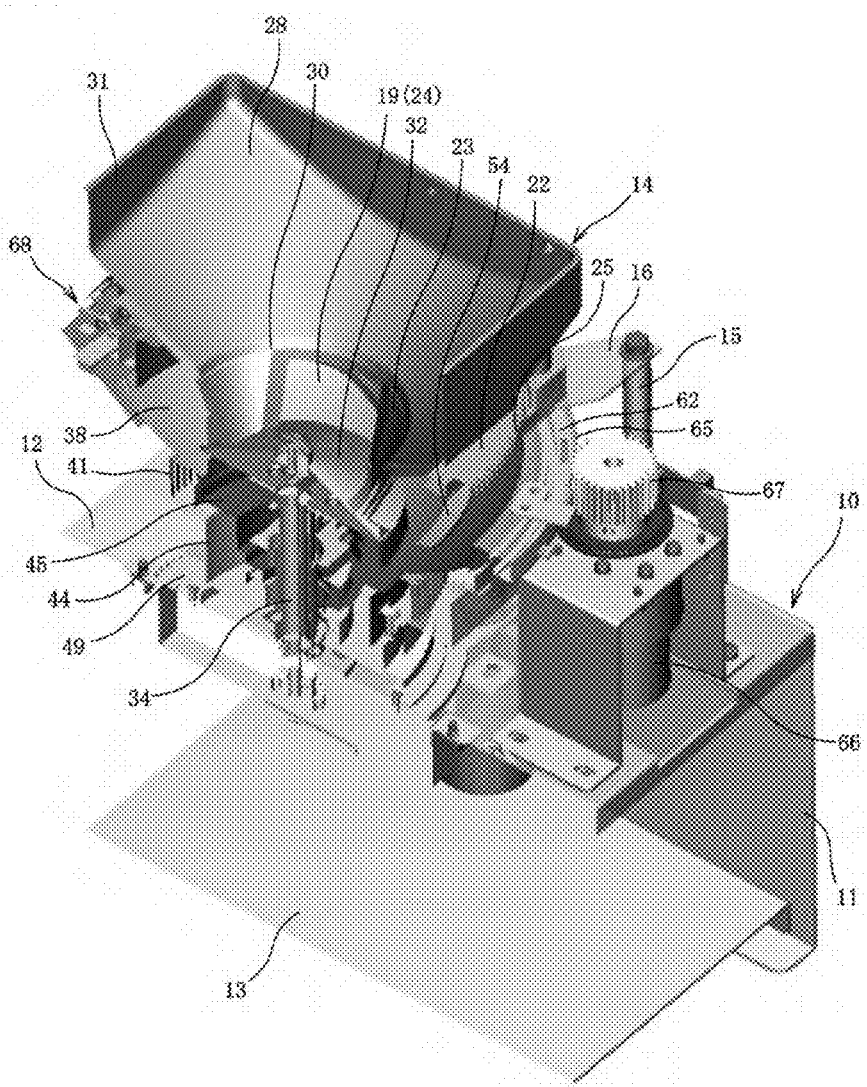
FIG. 1 is a cross-sectional perspective view showing a medicine counting device according to one embodiment of the present invention.
Figure 2:
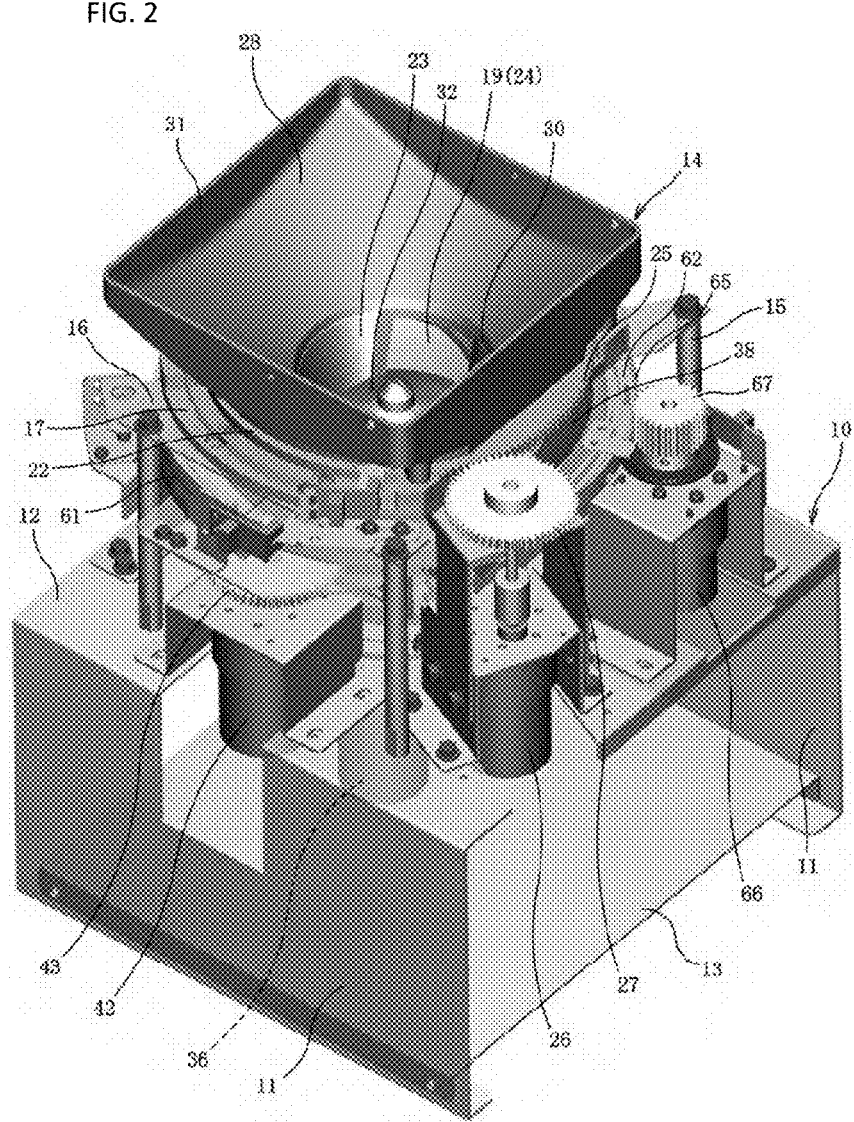
FIG. 2 is a perspective view showing the entire configuration of FIG. 1.
Figure 3:
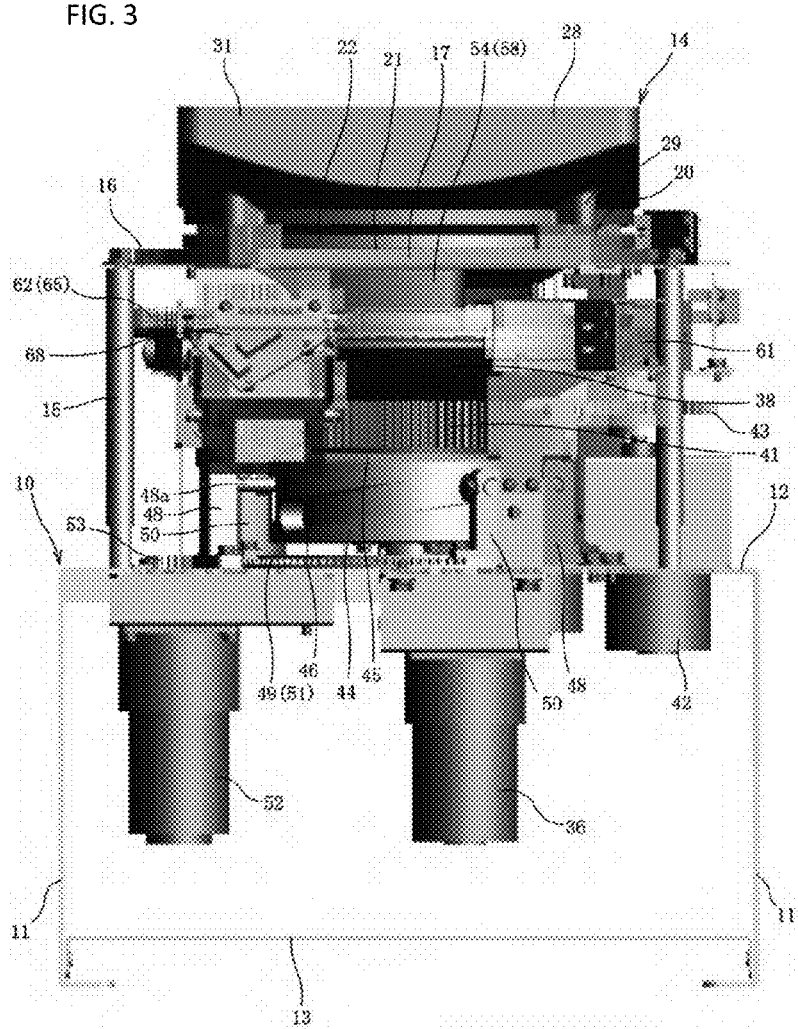
FIG. 3 is a front view of FIG. 2.

Embodiments of the present invention will be described hereinafter with reference to the accompanying drawings, in which preferred exemplary embodiments of the invention are shown. The ensuing description is not intended to limit the scope, applicability or configuration of the disclosure. Rather, the ensuing description of the preferred exemplary embodiments will provide those skilled in the art with an enabling description for implementing preferred exemplary embodiments of the disclosure. It should be noted that this invention may be embodied in different forms without departing from the spirit and scope of the invention as set forth in the appended claims FIG. 1 to FIG. 3 show a medicine counting device according to one embodiment of the present invention. This medicine counting device consists of hopper 14 capable of feeding a plurality of medicines, a feed member 32 to feed medicine in the inside of the hopper 14 to the outside, a rotary container 38 for transferring the supplied medicine, a guide member 54 to guide the medicine transferred by the rotary container 38, a container top member 62 having a regulator 63 to return a medicine that is not in contact with the guide member 54 to the central portion, and a counter 68 disposed in the outside of the rotary container 38.

A base 10 on which various members are disposed includes a pair of side surfaces 11 and 11, and a horizontal top surface part 12 that joins the top ends of these side surfaces. Bottom sides of the side surfaces 11 are connected by a coupling plate 13. And, on the top surface part 12 is provided with the rotary container 38, guide member 54, feed member 32 and hopper 14 in this order, and a counter 68 is disposed in the outer end section of the guide member 54.

Figure 4:
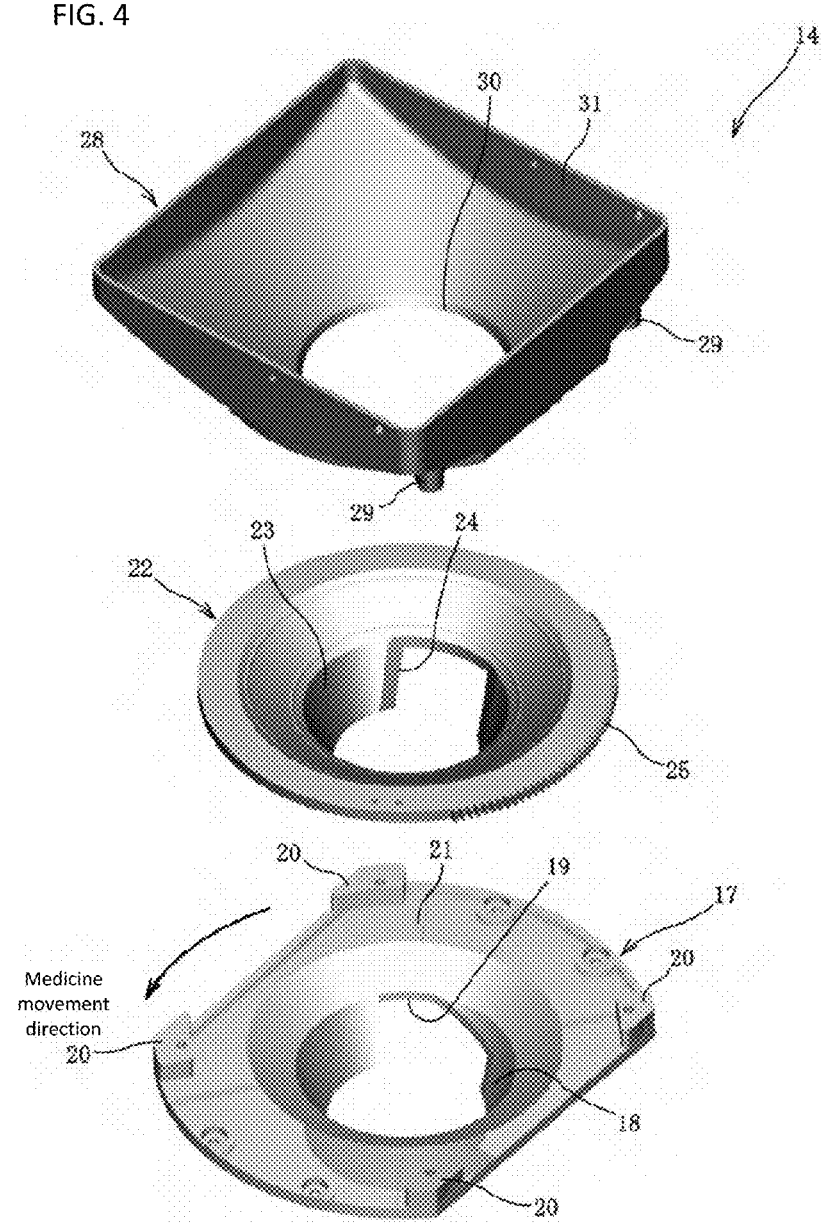
FIG. 4 is an exploded perspective view of hopper.

The hopper 14 is intended for supplying a large quantity of medicines to the central portion of the rotary container 38. As shown in FIG. 4, the hopper 14 of this embodiment includes: a lower hopper member 17 fixed to base 10 through a support rod 15 and support substrate 16; an adjustment member 22 disposed above the lower hopper member 17; and an upper hopper member 28 fixed on the lower hopper member 17 so as to be located over the adjustment member 22.

The lower hopper member 17 has an oval shape, and its center is provided with a cone-shaped feeding part 18 that is disposed so as to be located above the central portion of the rotary container 38. This feeding part 18 is provided with a feeding port 19 for feeding medicine to the outside of the hopper 14. This feeding port 19 is configured such that, with respect to the movement direction of medicine which is the rotation direction of the rotary container 38, the size of the opening gradually increases from the upstream towards downstream. Also, an attaching part 20, which is projecting upward, is provided in the four corners of the lower hopper member 17 for fixing the upper hopper 28. The inside of these attaching parts 20 is used as adjustment member installation sites 21 for installing the adjustment member 22 in a rotatable manner.

The adjustment member 22 adjusts the feed quantity of medicine by adjusting the opening area of the feed port 19. This adjustment member 22 is discoid, and its center is provided with a conical shaped inner cylindrical part 23 disposed inside the feeding part 18. The inner cylindrical part 23 is provided with an adjustment port 24 located inside the feeding port 19. Further, the outer circumference of the adjustment member 22 is provided with a gear portion 25 for receiving the rotational torque.

As shown in FIG. 2, a gear 27 coupled to the output shaft of an electric motor 26, which is the adjustment member drive means, is engaged with the gear portion 25 of the adjustment member 22. With this, upon driving the electric motor 26, the adjustment member 22 rotates in the circumferential direction around the axis of the inner cylindrical part 23. Upon rotating this adjustment member 22, the position of the adjustment port 24 with respect to the feeding port 19 of the lower hopper member 17 changes, and the feeding port 19 can be partially closed by the inner cylindrical part 23. As a result, the opening area of the feeding port 19 of hopper 14 can be adjusted.

As shown in FIG. 2 and FIG. 4, the upper hopper member 28 is provided with a boss 29 that is screwed to the attaching part 20. Thereupon, by fixing the upper hopper member 28 to the top of the lower hopper member 17, the adjustment member 22 is held rotatable between the lower hopper member 17 and the upper hopper member 28. The upper hopper member 28 is provided with a cylindrical communication hole 30 that is connected to the inside of the inner cylindrical part 23 of the adjustment member 22. This upper hopper member 28 forms a funnel-shape expanding outward from the communication hole 30 in the upward direction, and an outer circumferential wall 31 having a rectangular plane view is formed in the outer circumference.

Figure 5:
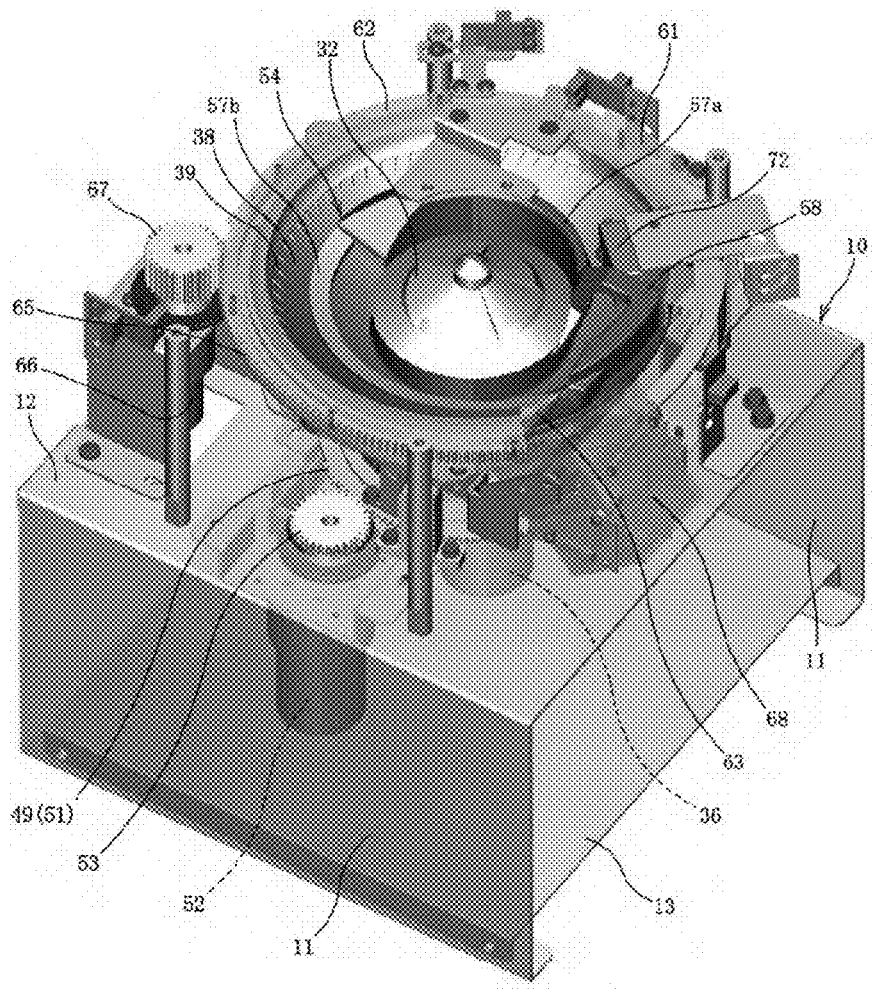
FIG. 5 is a perspective view showing a medicine counting device with the hopper removed.
Figure 6:
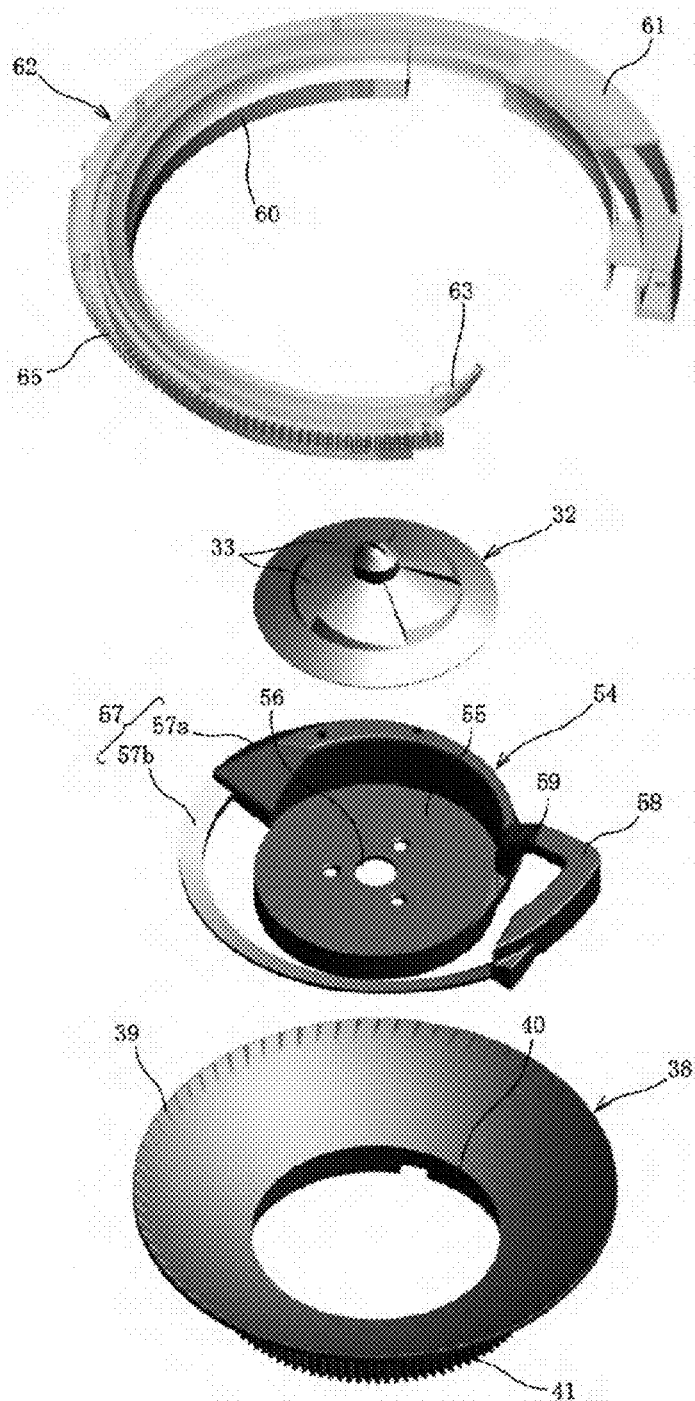
FIG. 6 is an exploded perspective view of the feed member, rotary container, guide member and container top member.

As shown in FIG. 1, FIG. 5 and FIG. 6, the feed member 32 is disposed in the center of the rotary container 38 so as to position at the bottom of the feeding part 18 of hopper 14. A center circle part 55 of the guide member 54 is disposed in the central portion of the rotary container 38, and the feed member 32 of this embodiment is disposed on this center circle section 55. The feed member 32 is formed in a conical shape whose bottom end diameter is larger than the outer diameter of the feeding part 18 of the hopper 14. Thereupon, in the section inside the hopper 14 is provided with a stepped section 33 for moving medicines so as to stir the medicines and feeding them to the outside through the feeding port 19 of the hopper 14.

Figure 7:
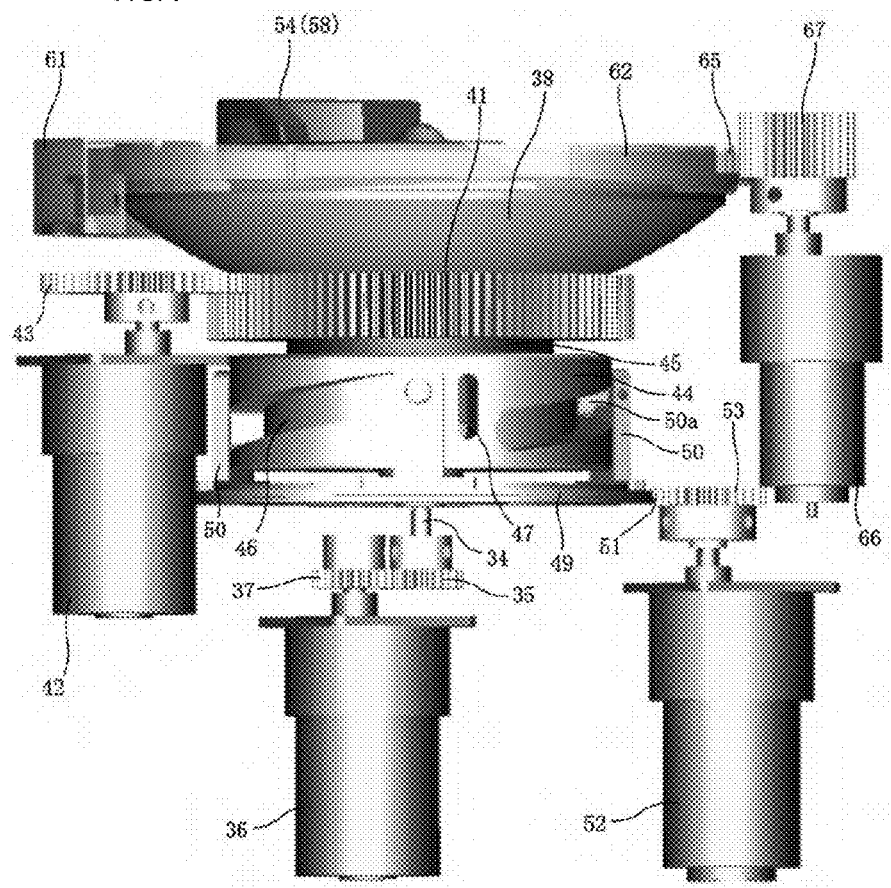
FIG. 7 is a front view showing the drive mechanism of feed member, rotary container and container top member.

As shown in FIG. 1 and FIG. 7, the feed member 32 is coupled to an upper edge of the rotating shaft 34 that is projecting vertically in an upward direction from base 10 along the axis of the hopper 14. The lower end of this rotating shaft 34 is coupled to a passive gear 35. This passive gear 35 is engaged with a drive gear 37 that is connected to an output shaft of the electric motor 36, which is the feed member driving means. Thus, by driving the electric motor 36, the feed member 32 is rotated at a predetermined rotational speed.

As shown in FIG. 1, FIG. 5 and FIG. 6, the rotary container 38 has a saucer shape whose diameter gradually increases in the upward direction. This rotary container 38 is formed such that the inclination angle of the outer circumference becomes larger than the inclination angle of the central portion. In other words, the central portion has a small inclination angle close to the horizontal whereas the outer circumference has a large inclination angle close to vertical. Here, the central portion of the present embodiment is closed by the above-mentioned feed member 32. A resistor portion 39 bulging upward is provided at equal intervals in the outer circumference of the top surface of the rotary container 38. Further, in the central portion of the rotary container 38, a circular through-hole 40 wherein the center circle part 55 of the guide member 54 is disposed is provided. Further, in the lower side of the rotary container 38, a gear portion 41 is provided for rotationally driving around the axis.

As shown in FIG. 7, the gear portion 41 of the rotary container 38 is engaged with a gear 43 coupled to the output shaft of an electric motor 42, which is the rotary container drive means. With this, by driving the electric motor 42, the rotary container 38 is rotated at a predetermined rotational speed around the axis.

In this embodiment, a lifting mechanism for adjusting the gap between the rotary container 38 and the guide member 54 is provided at the bottom of the rotary container 38. This lifting mechanism is provided with a cam member 44 and a base substrate 49 such that, by raising and lowering the rotary container 38 along the axis, the gap between the rotary container 38 and the guide members 54 located in the upper side can be adjusted.

The cam member 44 is of cylindrical shape, and the cam member 44 is coupled to the rotary container 38 via the connecting member 45 such that it is rotatable relative to the rotary container 38 and is not movable along the axis. Three cam grooves 46 extending from the bottom toward the upper direction are provided in the outer circumference of the cam member 44. Also, in the outer circumference of the cam member 44, a rotation-preventing groove 47 extending in the vertical direction is provided so as to be positioned between the cam grooves 46 and 46. Inserted in this rotation-preventing groove 47 is a rotation-preventing pin 48a (see FIG. 3) of the fastening member 48 that is disposed on the upper surface 12 of the base 10.

Figure 8:
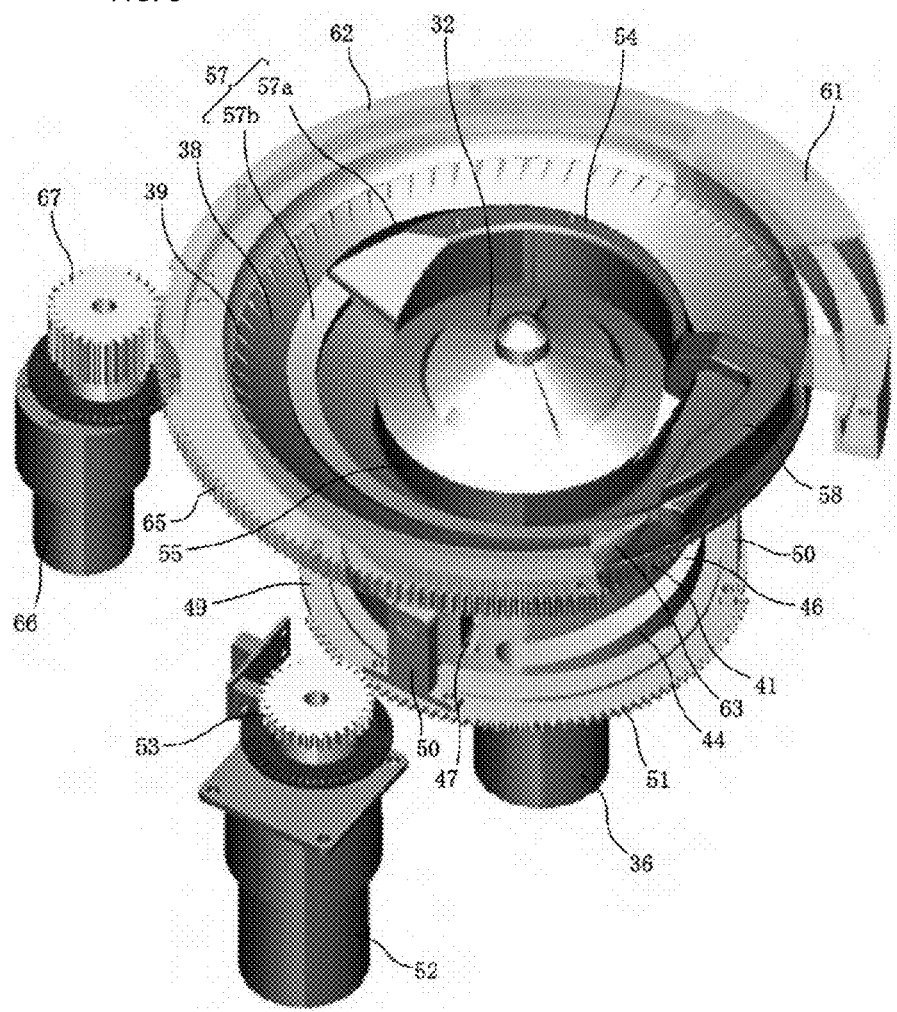
FIG. 8 is a perspective view of FIG. 7.

As shown in FIG. 5 and FIG. 8, a base substrate 49 is disposed in a rotatable manner on the top surface 12 of the base 10 so as to be positioned coaxially on the axis of the rotary container 38. This base substrate 49 is provided with a fastening member 50 having an interlocking convex portion 50a that interlocks with the cam groove 46 of the cam member 44. Further, a gear portion 51 for receiving the rotational torque is provided in the outer circumference of the base substrate 49.

The gear portion 51 of the base substrate 49 is engaged with a gear 53 coupled to the output shaft of the electric motor 52, which is the lifting mechanism drive means. Therefore, with this lifting mechanism, when the base substrate 49 is rotated by driving the electric motor 52, the fastening member 50 rotates together with the base substrate 49. During this, the cam member 44 cannot rotate around the axis as it is fastened to the fastening member 48 that is coupled to base 10. Therefore, when the base substrate 49 is rotated, the interlocking convex portion 50a of the fastening member 50 slides along the cam groove 46 of the cam member 44. As a result, the interlocking convex portion 50a presses the cam groove 46, and the cam member 44 will move up and down along the axis. Therefore, the rotary container 38 that is connected in a rotatable manner via the connecting member 45 will move up and down in conjunction with the cam member 44.

As shown in FIG. 5 and FIG. 6, the guide member 54 is fixed to a bracket disposed on the support substrate 16 so as to be positioned on the top surface of the rotary container 38 with a predetermined gap therebetween. This guide member 54 is provided with a center circle part 55 that is disposed (preferably, disposed with a slight clearance) in the through-hole part 40 of the rotary container 38. A through-hole 56 for the rotating shaft 34 of the feed member 32 to penetrate is formed in the center of this center circle part 55. The guide member 54 is provided with a guide part 57 that spirally extends from the center circle part 55 (i.e. the central portion of the rotary container 38) towards the outer circumference of the rotary container 38 and that guides medicine that is moved by rotation of the rotary container 38 towards the outside of the rotary container 38 from the central portion.

In FIG. 6, the guide part 57 of the present embodiment extends counterclockwise from the top right side of the center circle part 55 and extends roughly 360°. Projecting from its starting point section is an arm part 58 having an L-shape in plan view, and the outer end section of the guide part 57 is connected to a tip of this arm part 58. Approximately half of the area from the starting point of the guide part 57 is considered as inner guide part 57a, and the remaining area is considered as outer guide part 57b, and the overall height of the inner guide part 57a located at the central portion is formed to be higher than the overall height of the outer guide part 57b located in the outer circumference. Further, the inner guide part 57a is provided so as to be integrally continuous with the center circle part 55. The outer guide part 57b is formed in a thin arc-shaped surface that extends from the end section of the inner guide part 57a along the top surface 12 of the rotary container 38.

Figure 9:
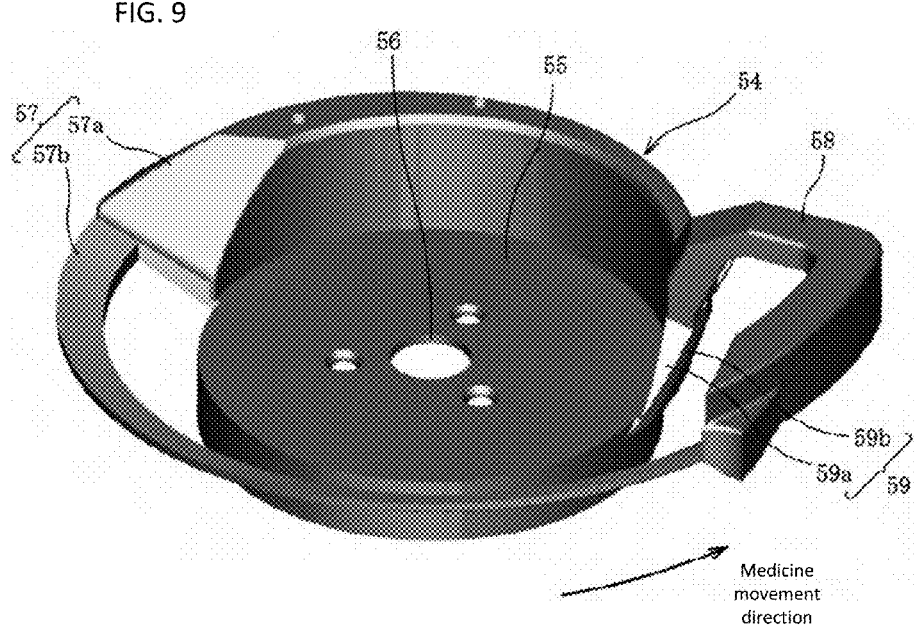
FIG. 9 is a perspective view showing a guide member.

Moreover, at the starting point that is an end section in the upstream of the medicine moving direction of the inner guide part 57a, a turnover part 59 for turning over medicine such that the radial direction of a discoid medicine to be roughly horizontal from roughly vertical is provided. This turnover part 59 is extending from approximately the center of the total height of the inner guide part 57a so as to contact the top surface of the center circle part 55. The turnover part 59 of this embodiment, as shown in FIG. 9, is comprised of a first surface 59a that inclining in a downstream side of the medicine movement direction from the center towards the outside in the radial direction, and a second surface 59b that is extending from the edge of outside in the radial direction of the first surface 59a to the downstream of the medicine movement direction and that is inclining in the outer upper direction (inclines such that the upper side is located further in the outside in the radial direction). Moreover, in the assembled state, the feeding port 19 of hopper 14 is positioned at the center circle part 55 in a region opposite to the inner guide part 57a.

As shown in FIG. 5 and FIG. 6, in addition to disposing the container top member 62 on the guide rail 60 fixed to the support rod 15, an edge in the upstream side of the medicine movement direction is supported by an arc-shaped supporting frame 61. This container top member 62 is disposed in the upper area of the outer circumference of the rotary container 38. The container top member 62 has an inclined guide surface in which the upper side is located further in the outside in the radial direction of the rotary container 38. The guide surface extends continuously onto the top surface of rotary container 38, and has a C-shape in the plane view. The guide surface of this container top member 62 may be formed to have an inclination angle larger than the inclination angle of the outer circumference of the rotary container 38. A regulator 63 is provided at an end of this container top member 62 in the downstream of medicine movement direction.

Figure 10:
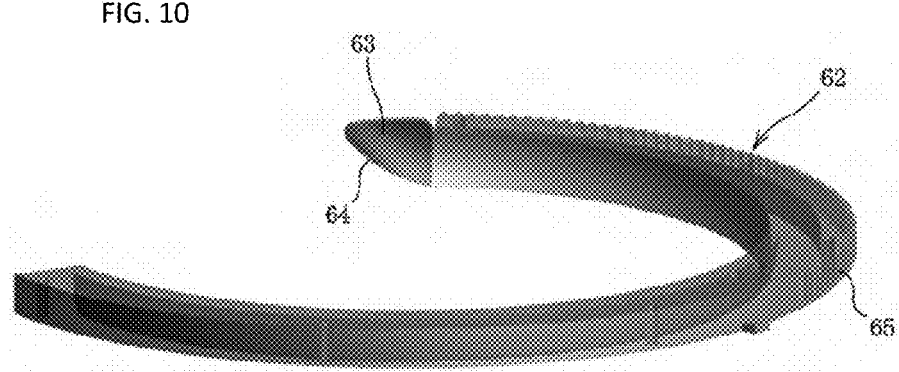
FIG. 10 is a perspective view showing the container top member.

Among the medicines that are moved towards the counter 68 (the medicine guided out of the rotary container 38), medicines in the second row that are not in contact with the guide member 54 will be returned by this regulator 63 to the central portion of the rotary container 38 by overpassing the first row of medicines that are in contact with the guide member 54 and the guide member 54. This regulator 63 has a shape that is curved towards the center of the rotary container 38. Further, as shown in FIG. 10, the lower edge of the regulator 63 is formed into an arched edge 64 that is curved upward. With this, an outlet through which a medicine can pass will be formed between the lower area of this arched edge 64 and upper area of the outer circumferential edge of the rotary container 38. Furthermore, in the outer circumference of the container top member 62 is provided with a gear portion 65 for receiving the rotational torque.

The gear portion 65 of the container top member 62 is engaged with a gear 67 coupled to the output shaft of the electric motor 66, which is the regulator adjustment means. With this, by driving the electric motor 66, the container top member 62 will rotate around the axis of the rotary container 38. When regulator 63 approaches the outer end of the guide member 54 by rotation, the lateral width of the outlet through which a medicine can pass will become narrower, and a medicine with a larger diameter will not be able to pass through. When the regulator 63 moves away from the guide member 54 by rotation, the lateral width of the outlet through which a medicine can pass will become larger, and a medicine with a larger diameter will be able to pass through.

Figure 12:
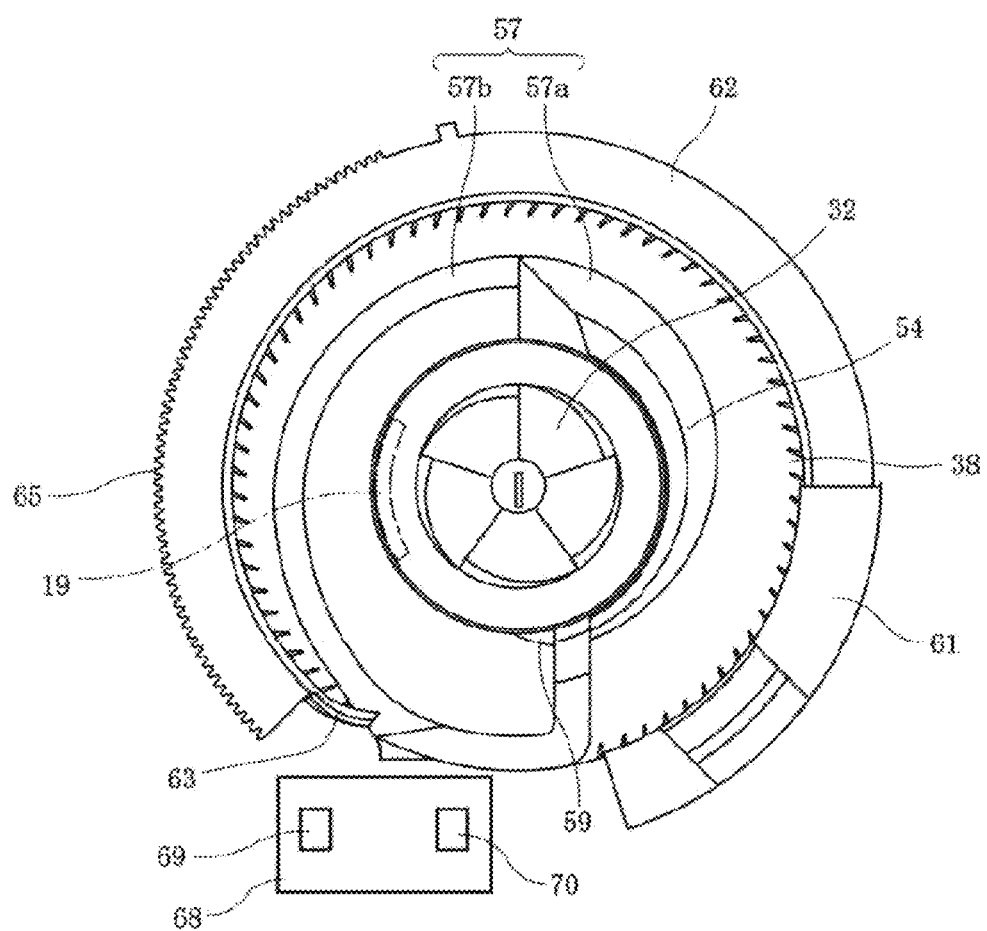
FIG. 12 is a plan view showing the feed member, rotary container, guide member and container top member.

As shown in FIG. 5 and FIG. 12, the counter 68 is provided on the outside of the rotary container 38. This counter 68 is provided with a detector consisting of a light sensor that is comprised of a light emitting part 69 and a light receiving part 70. The counter 68 detects the passage of one medicine when light from the light emitting part 69 to light receiving unit 70 is blocked, and light from the light emitting part 69 is received by the light receiving unit 70 again.

Figure 11:
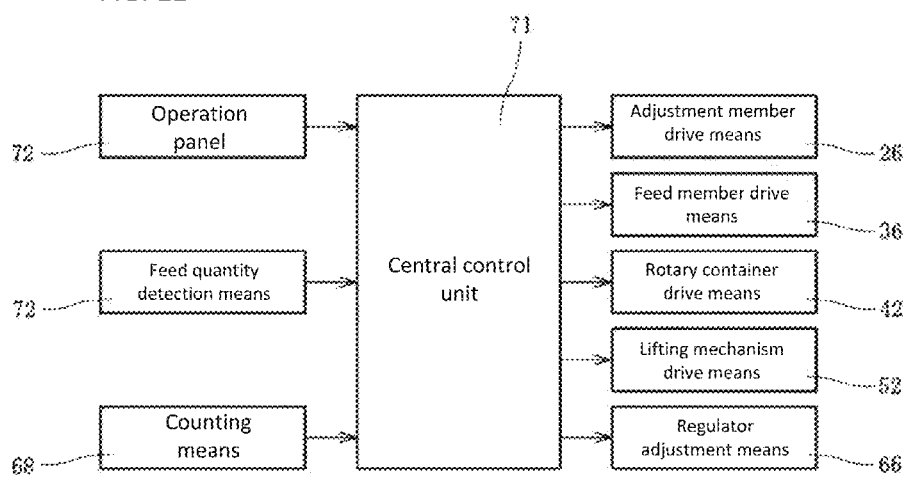
FIG. 11 is a block diagram showing the configuration of the medicine counting device.

In this medicine counting device, as shown in FIG. 11, each of the electric motors 26, 36, 42, 52 and 66 are controlled by the command of the central control unit 71. Specifically, an operator selects medicine to be counted by operating the operation panel 72. With this, on the basis of the information about a shape and size of a medicine such as the vertical size, lateral size and height etc. that have been stored in advance, the central control unit 71 drives the electric motor 52 of the lifting mechanism drive means to adjust the gap between the rotating container 38 and the guide member 54, and further, drives the electric motor 66 of the regulator adjustment means to adjust the gap between the guide member 54 and the regulator 63, which is the width of the medicine outlet. In this way, the opening area of the medicine outlet is adjusted such that the selected medicine can pass through one-by-one.

Thereupon, when counting the medicine, a large quantity of medicine is charged into the hopper 14 that is disposed on the central portion of the rotary container 38. During counting, the electric motor 36 of the feed member drive means and the electric motor 42 of the rotary container drive means are driven, and the medicine is detected and counted by the counter 68. Furthermore, the electric motor 42 that rotates the rotary container 38 is set to a rotational speed that can dispense at least 20 medicines per second in order to return the medicine in the second row or beyond that are not in contact with the guide member 54 to the central portion by overpassing the first row of medicine and the guide member 54.

Figure 13A:
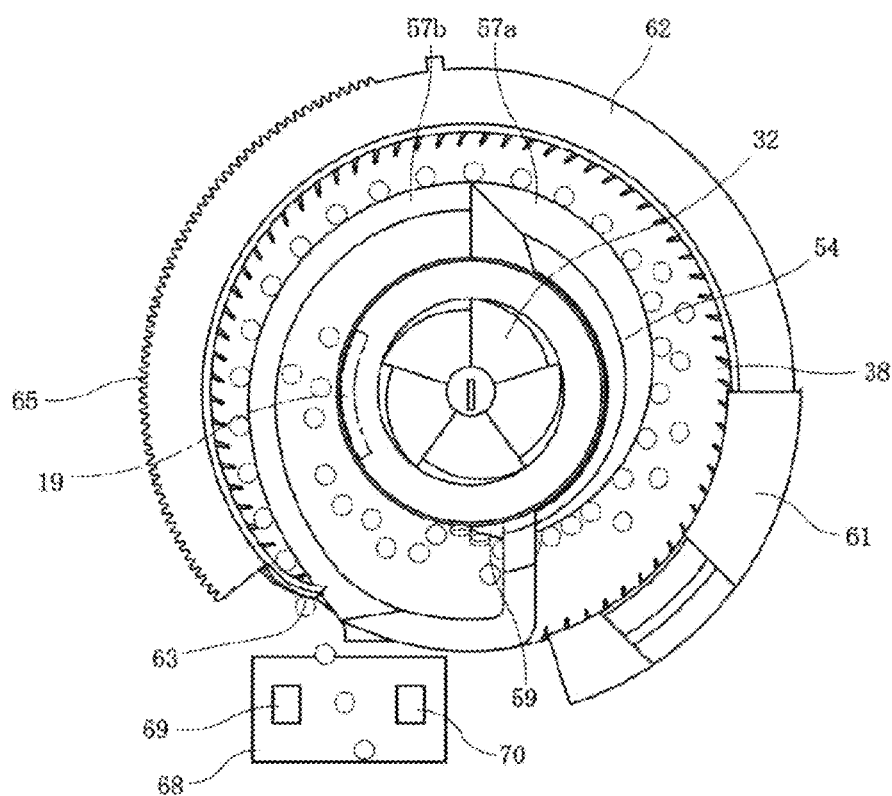
FIG. 13A is a plan view showing a state wherein the feed quantity of the medicine from hopper is small.

Here, with the help of the medicine detection sensor 72 (see FIG. 5) that is a feed quantity detector disposed so as to be located in the outer circumference of the inner guide part 57a, the quantity of medicine accumulated outside the inner guide part 57a is detected. As shown in FIG. 13A, when the feed quantity is small, the central controller 71 widens the opening area of the feeding port 19 of the hopper 14 by driving the electric motor 26 of the adjustment member drive means, and thereby increases the quantity of the medicine supplied from the inside of the hopper 14 to the outside. On the other hand, as shown in FIG. 13B, when the feed quantity is large, the opening area of the feeding port 19 of the hopper 14 becomes smaller, and the quantity of the medicine supplied from the inside of the hopper 14 to the outside is decreased. Then, it is adjusted such that almost all of the medicines are in contact with the rotary container 38. Regarding adjustment of the medicine feed quantity, along with the adjustment of the opening area of the feeding port 19 of hopper 14, the rotational speed of the electric motor 36 of feed member drive means is controlled to increase the quantity by increasing the speed, or to decrease the quantity by reducing the speed.

Thus, in this embodiment, the opening area of the feeding port 19 of hopper 14 can be adjusted by moving the adjustment member 22, and therefore, the quantity of the medicine supplied to the rotary container 38 can be adjusted. Therefore, it is possible to not only prevent the delay in counting speed when the feed quantity is small, but also prevent medicine from getting stuck or piling when the feed quantity is large. Moreover, because the feed member 32 that is rotationally driven by the electric motor 36 is disposed in the central portion of the rotary container 38, medicine in hopper 14 can be fed onto the rotary container 38 with certainty. Also, because this feed member 32 is rotationally driven by an electric motor 36 that is different from the electric motor 42 of the rotary container 38, the medicine feed quantity can be efficiently adjusted by adjusting the rpm as per the medicine feed quantity on the rotary container 38. In addition, it is possible to prevent an impact on the return action of medicine in the second row or beyond by rotation of the rotary container 38.

Next, the function of counting substantially discoid tablet, which is a type of medicine, by the medicine counting device is explained. First, discoid tablets are fed onto the rotary container 38 through hopper 14, and at the same time, the rotary container 38 is rotated.

Figure 14A:
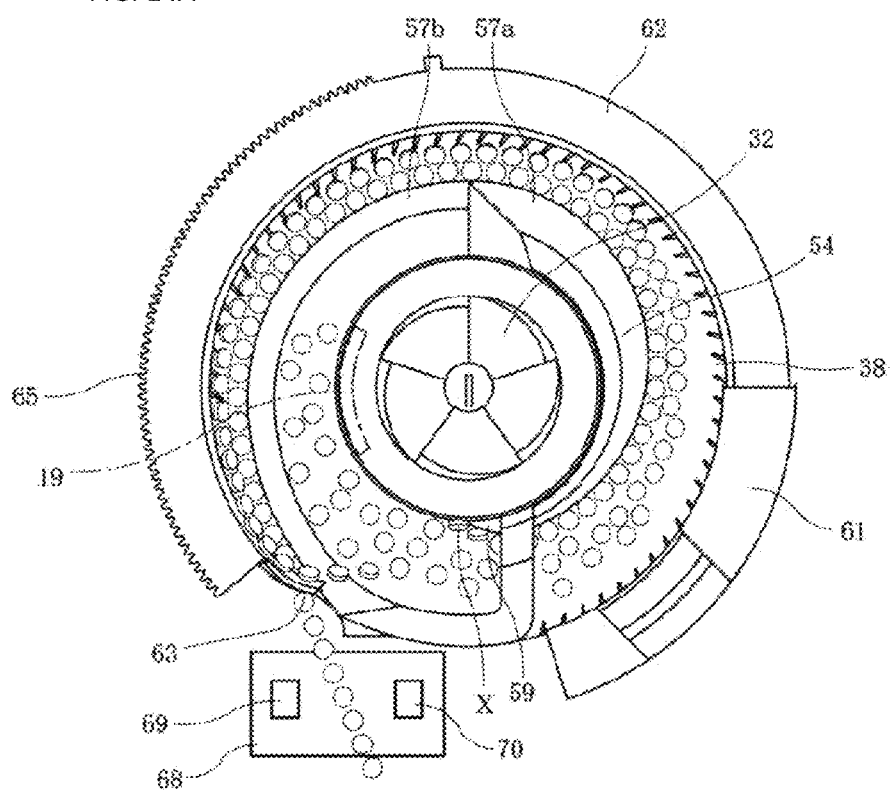
FIG. 14A is a plan view wherein medicine is supplied in the form of tablets.

As shown in FIG. 14A, when the discoid tablets are fed from hopper 14 onto the rotary container 38, they will slide towards the center due to the inclination of the rotary container 38. Here, because the inclination angle of the central portion of the rotary container 38 is small, a discoid tablet fed from hopper 14 onto the rotary container 38 may assume a standing state in which the diameter direction is extended in the vertical direction (see tablet X in FIG. 14A). In this case, even if the rotary container 38 is rotated, the discoid tablet X rotates by itself and does not move to the downstream side. However, in this embodiment, a turnover part 59 is provided in the upstream end of the inner guide part 57a, and therefore, a discoid tablet can be overturned to horizontal direction especially by the second side 59b that is inclining towards the outside. Therefore, by increasing the area of contact with the rotary container 38 by overturning of the discoid tablet X, it becomes possible to increase frictional resistance and to prevent a state of tablet not moving to downstream. As a result, it becomes possible to reliably move all of the discoid tablets to the downstream to be counted.

Also, because the inclination angle of the rotary container 38 is small on the outside of inner guide part 57a, discoid tablets may pile up on other discoid tablets on the rotary container 38. However, in this embodiment, because the overall height of the inner guide part 57a is made higher than the overall height of the outer guide part 57b, the discoid tablets on the upper side of the pile can be prevented from moving onto the guide part 54. As a result, it becomes possible to count all the medicines reliably.

Even though a discoid tablet moves to the region of the outer guide part 57b after passing through the region of the inner guide part 57a, other discoid tablets may pile on top of the discoid tablets on the rotary container 38. However, in this embodiment, because the inclination angle of the rotary container 38 is made larger in the area of this outer guide part 57b, due to this inclination, it is possible to make a discoid tablet at top of a pile to slide and fall to the central portion by overpassing the outer guide part 57b. Therefore, it is possible to prevent simultaneous dispensing of two discoid tablets in an overlapped state to the counter 68.

The inclination angle of the rotary container 38 is larger in the area where the outer guide part 57b is disposed, but discoid tablets in the first row that are in contact with the outer guide part 57b will move in a state where tablets are on the edge of the outer guide part 57b. Further, in the outside of the first row of discoid tablets in the radial direction, a second row of discoid tablets is formed, this second row moves in a state of being piled up on the edge of this first row of discoid tablets without contacting the outer guide part 57b. Moreover, depending on the diameter of the discoid tablet, a third row of discoid tablets may be further formed in the outside in the radial direction of this second row of discoid tablets. The first row of discoid tablets will gradually move along the guide member 54 towards the outer circumference of the rotary container 38, while the second row of discoid tablets is pushed to the guide surface by the first row of discoid tablets and moves towards the regulator 63 by moving on the guide surface.

Among the many rows of discoid tablets moved towards the counter 68, by adjusting a gap between the rotary container 38 and guide member 54 as well as adjusting an outlet width by container top member 62, only the discoid tablets of the first row that are in contact with the guide member will be able to pass through the medicine outlet and be dispensed to the counter 68. Also, in this embodiment, because a regulator 63 that is curved towards the center of rotary container 38 is provided at the end of the medicine movement direction in the downstream of the guide surface, the discoid tablets in the second row and beyond that are not in contact with the guide member 54 can be returned toward the center portion by overpassing the guide member 54. That is, in this embodiment, a discoid tablet that is in contact with the guide member 54 and a discoid tablet that is not in contact with the guide member 54 will travel through different spaces. Therefore, there is no chance of collision between a discoid tablet in contact with the guide member 54 and a discoid tablet that is not in contact with the guide member 54.

As a result, it is possible to avoid drawbacks such as clogging of disc-shaped tablets, or inability to dispense discoid tablets at a high speed. Unlike Patent document 2, there is no regulating member to change the moving direction of a medicine and also there is no chance of collision between of medicines in the first row and the second row, and therefore, even if the medicine dispensing speed is increased by increasing the rotational speed of the rotary container 38, drawbacks such as chipping and breaking of medicines are not likely to occur. Further, the medicines in the second row that were pushed to the guide surface located on the upper side of the outer circumference of the rotary container 38 will be returned by the regulator 63 towards the center of the rotary container 38. In other words, a medicine B that is returned towards the center of the rotary container 38 by the regulating member 63 is at a higher position than a medicine A that is in contact with the guide member 54. Consequently, even though a medicine B that is not in contact with the guide member 54 is not raised higher, it is possible to return it towards the center of the rotary container 38 by overpassing the medicine A in contact with the guide member 54 and the guide member 54.

Next, the counting operation of capsule medicine whose shape and size are different from the discoid tablet will be explained.

Figure 14B:
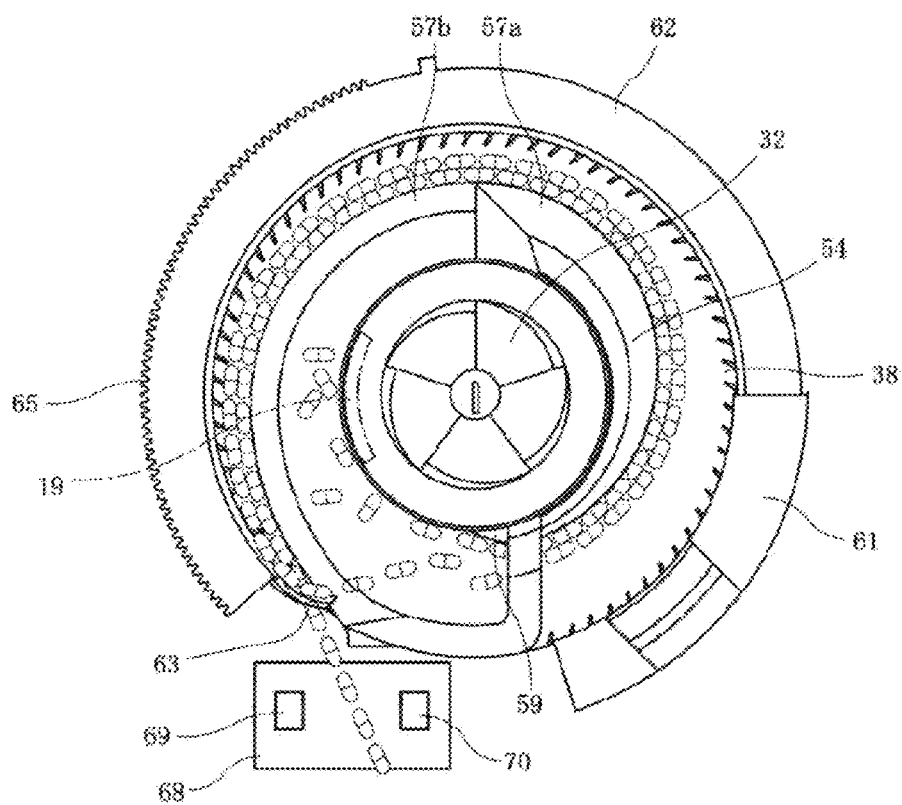
FIG. 14B is a plan view wherein medicine is supplied in the form of capsules.
Figure 15:
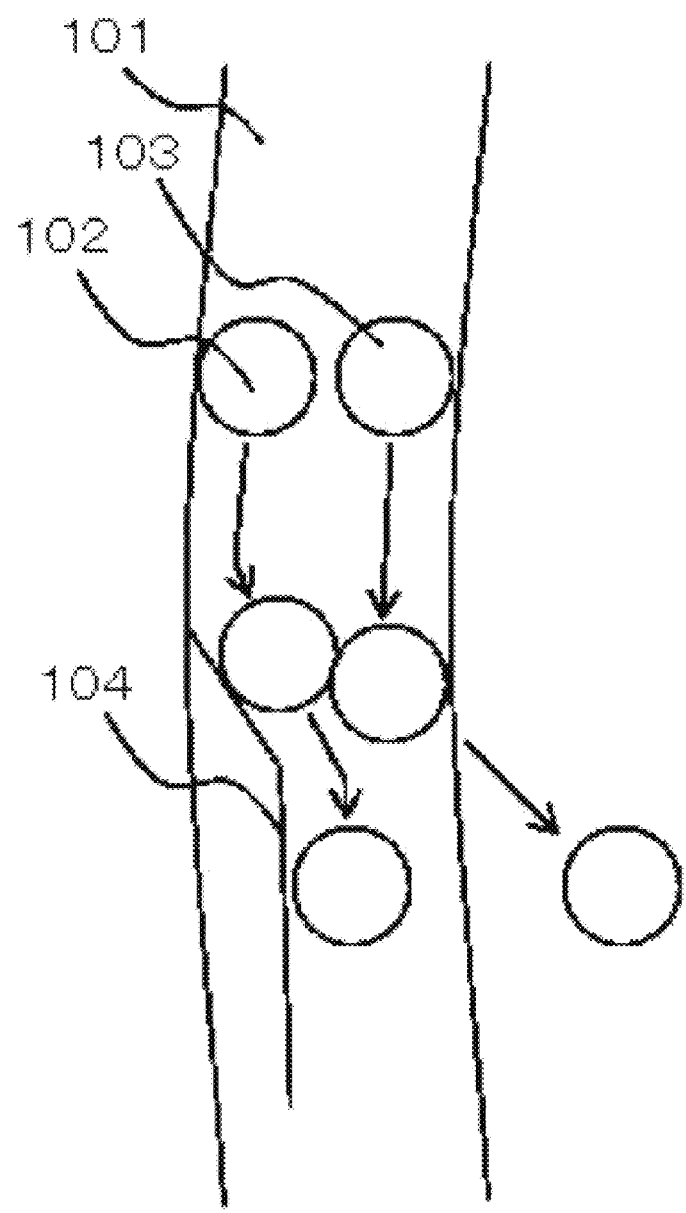
FIG. 15 is a plan view showing a part of the parts feeder of Patent Document 2.

As shown in FIG. 14B, when a capsule having an oblong shape in a plan view is fed from a hopper 14 onto the rotary container 38, it will slide towards the center due to the inclination of the rotary container 38 in a manner similar to the discoid tablet, and align such that the medicine feed direction becomes the longitudinal direction. Then, similarly to the case of discoid tablet, it will pass through the inner guide part 57a, moves to the outer guide part 57b, and only the first row of capsules is fed from the medicine outlet at the end of this outer guide part 57b to the counter 68, and counted. The capsule medicines that are in the second row and beyond that are not in contact with the guide member 54 will be returned by the regulator 63 towards the center.

Thus, in the medicine counting device of the present invention, because medicine is moved along the guide member 54 by rotation of the rotary container 38, medicines of different shapes having different vertical size, lateral size and height etc. can be transferred and counted with certainty. Also, as long as the medicines have approximately same width, even if the shape of medicine is different, they can be counted without the need for adjusting the gap between the rotary container 38 and guide member 54, or the outlet width by the regulator 63. Therefore, it is possible to increase the versatility of a high speed counting of medicine.

Moreover, the medicine counting device of the present invention is not limited to the configuration of the embodiment described above, and various modifications are possible.

For example, in the above embodiment, description was made with discoid tablets and oblong capsules as an object for counting, but it is also possible to reliably move and count medicines such as elliptical tablets. Also, by providing radially projecting convex part or concave grooves in the rotary container 38, it is possible to reliably move and count spherical shaped medicines.

In the embodiment described above, a separate feed member 32 was provided in the central portion of the rotary container 38, and this feed member 32 was rotated by a dedicated electric motor 36. However, it is also possible to configure such that this feed member 32 and the through-hole 40 in the rotary container 38 are excluded, and to provide a configuration to integrally rotate the central portion of the rotary container 38. In such a case, it is configured such that the center circle part 55 is not provided in the guide member 54, and only the guide part 57 consisting of inner guide part 57a and outer guide part 57b, and the arm 58 are provided.

The invention claimed is:

1. A medicine counting device comprising:
   a rotary container broadening radially in an upward direction and configured to rotate around an axis of said rotary container by a drive unit, wherein a plurality of medicines are configured to be fed into a central portion of said rotary container;
   a guide member disposed, with a predetermined gap, on a top surface side of said rotary container, and is configured to guide a medicine, moved by a rotation of said rotary container, from the central portion towards an outer circumference of said rotary container; and
   a detector provided outside of said rotary container,
   wherein:
   the guide member comprises a guide part extending spirally from the central portion of the rotary container towards an outer circumference thereof, and
   the guide part comprises:
   an inner guide part located in a central portion side of said guide member, and an outer guide part located in an outer circumference side of said guide member, wherein a maximum height of said inner guide part is higher than a maximum height of said outer guide part.

2. The medicine counting device according to claim 1, wherein said guide member further comprises a turnover part for overturning a radial direction of medicines from a vertical direction to a horizontal direction.

3. The medicine counting device according to claim 1, wherein the predetermined gap is vertically adjustable by moving up and down either of the rotary container or the guide member along the axis of said rotary container.

4. The medicine counting device according to claim 1, wherein an inclination angle of the outer circumference of the rotary container is greater than an inclination angle of the central portion of the rotary container.

5. The medicine counting device according to claim 2, wherein the predetermined gap is vertically adjustable by moving up and down either of the rotary container or the guide member along the axis of said rotary container.

6. The medicine counting device according to claim 2, wherein an inclination angle of the outer circumference of the rotary container is greater than an inclination angle of the central portion of the rotary container.

7. The medicine counting device according to claim 1, wherein the outer guide part is positioned in a higher place than the inner guide part, with respect to the rotary container.

8. The medicine counting device according to claim 1, wherein said guide member further comprises a center circle part which is formed continuously integral with the inner guide part.

9. The medicine counting device according to claim 8, wherein the outer guide part is formed in a thin arc-shaped surface extending from an end section of the inner guide part along the top surface side of the rotary container.

10. The medicine counting device according to claim 9, wherein the guide member further comprises an arm part having an L-shape where both end sections of the guide part are connected to a tip of said arm part.

11. The medicine counting device according to claim 10, wherein the turnover part extends downwardly, from a position approximately located in a center of a total height of the inner guide part, so as to contact a top surface of the center circle part.

* * * * *